(12) United States Patent
Girardey et al.

(10) Patent No.: US 11,920,972 B2
(45) Date of Patent: Mar. 5, 2024

(54) MONITORING THE STATE OF A VIBRONIC SENSOR

(71) Applicant: Endress+Hauser SE+Co. KG, Maulburg (DE)

(72) Inventors: Romuald Girardey, Blotzheim (FR); Raphael Kuhnen, Schliengen (DE); Izabella Sandor, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 206 days.

(21) Appl. No.: 17/602,906

(22) PCT Filed: Mar. 12, 2020

(86) PCT No.: PCT/EP2020/056724
§ 371 (c)(1),
(2) Date: Oct. 11, 2021

(87) PCT Pub. No.: WO2020/207699
PCT Pub. Date: Oct. 15, 2020

(65) Prior Publication Data
US 2022/0196456 A1    Jun. 23, 2022

(30) Foreign Application Priority Data
Apr. 10, 2019 (DE) .................... 10 2019 109 487.9

(51) Int. Cl.
*G01F 25/20* (2022.01)
*G01F 23/296* (2022.01)

(52) U.S. Cl.
CPC ............ *G01F 25/20* (2022.01); *G01F 23/296* (2013.01)

(58) Field of Classification Search
None
See application file for complete search history.

(56) References Cited

U.S. PATENT DOCUMENTS

| | | | |
|---|---|---|---|
| 2004/0061511 A1* | 4/2004 | Kawakatsu | G01F 23/804 324/707 |
| 2014/0373607 A1* | 12/2014 | Bauer | G01N 9/002 73/64.53 |
| 2020/0191693 A1* | 6/2020 | Kuhnen | G01F 1/8422 |

FOREIGN PATENT DOCUMENTS

| | | |
|---|---|---|
| DE | 102011075113 A1 | 11/2012 |
| DE | 102016117194 A1 | 3/2018 |
| DE | 102017115147 A1 | 1/2019 |
| WO | 2011038985 A1 | 4/2011 |

* cited by examiner

*Primary Examiner* — Kristina M Deherrera
*Assistant Examiner* — Mark A Shabman
(74) *Attorney, Agent, or Firm* — Mark A. Logan; Endress+Hauser (USA) Holding, Inc.

(57) ABSTRACT

The invention relates to a method for state monitoring of a coil that is part of a device for determining at least one process variable of a medium in a containment. The method includes supplying the coil with an electrical excitation signal and receiving an electrical, received signal from the coil, ascertaining a first frequency for the excitation signal, in the case of which a first phase shift between the excitation signal and received signal is less than a predeterminable limit value, and ascertaining a state indicator for the coil based on the first frequency. Further disclosed is a device embodied for performing a method of the invention.

11 Claims, 4 Drawing Sheets

MONITORING THE STATE OF A VIBRONIC SENSOR

CROSS-REFERENCE TO RELATED APPLICATIONS

The present application is related to and claims the priority benefit of German Patent Application No. 10 2019 109 487.9, filed on Apr. 10, 2019 and International Patent Application No. PCT/EP2020/056724, filed on Mar. 12, 2020, the entire contents of which are incorporated herein by reference.

TECHNICAL FIELD

The invention relates to a method for state monitoring of a coil, which is part of a device for determining at least one process variable of a medium in a containment, as well as to a device embodied for performing a method of the invention. The device is a vibronic sensor. The device includes a mechanically oscillatable unit, a driving/receiving unit, and an electronics unit. The process variable can be, for example, the fill level, especially a limit level, the flow of the medium or even its density or viscosity. The medium is located in a containment, e.g. a container, a tank, or even a pipeline. The medium, in turn, is, for example, a liquid, a gas, or a bulk good.

BACKGROUND

Vibronic sensors are widely used in process and/or automation technology. In the case of fill level measuring devices, such have at least one mechanically oscillatable unit, such as, for example, an oscillatory fork, a single tine or a membrane. Such is excited during operation by means of a driving/receiving unit, frequently in the form of an electromechanical transducer unit, such that mechanical oscillations are executed. The electromechanical transducer unit can, in turn, be, for example, a piezoelectric drive or an electromagnetic drive. Corresponding field devices are manufactured by the applicant in great variety and sold, for example, under the mark LIQUIPHANT or SOLIPHANT. The underlying measuring principles are known in principle from a large number of publications. The driving/receiving unit excites the mechanically oscillatable unit by means of an electrical excitation signal, such that mechanical oscillations are executed. Conversely, the driving/receiving unit can receive the mechanical oscillations of the mechanically oscillatable unit and transduce them into an electrical, received signal. The driving/receiving unit is embodied either in the form of separate driving and receiving units, or as a combined driving/receiving unit.

The driving/receiving unit is in many cases part of a feedback, electrical, oscillatory circuit, by means of which the exciting of the mechanically oscillatable unit occurs, such that mechanical oscillations are executed. For example, for a resonant oscillation, the oscillatory circuit condition must be fulfilled, according to which the amplification factor is ≥1 and all phases in the oscillatory circuit must add to a multiple of 360°. For exciting and fulfilling the oscillatory circuit condition, a certain phase shift between the excitation signal and the received signal must be assured. Therefore, frequently a predeterminable value for the phase shift, thus, a desired value for the phase shift, is set between the excitation signal and the received signal. For this, the state of the art provides the most varied of solutions, both analog as well as also digital, such as, for example, described in DE102006034105A1, DE102007013557A1, DE102005015547A1, DE102009026685A1, DE102009028022A1, DE102010030982A1 or DE00102010030982A1.

Both the excitation signal as well as also the received signal are characterized by frequency ω, amplitude A and/or phase φ. Correspondingly, changes in these variables are usually taken into consideration for determining the process variable of interest. The process variable can be, for example, a fill level, a predetermined fill level, or the density or viscosity of the medium, as well as a flow. In the case of a vibronic limit level switch for liquids, for example, it is distinguished, whether the oscillatable unit is covered by the liquid or freely oscillating. These two states, the free state and the covered state, are distinguished in such case, for example, based on different resonance frequencies, thus, based on a frequency shift.

The density and/or viscosity, in turn, can only be ascertained with such a measurement device, when the oscillatable unit is covered by the medium. In connection with determining the density and/or viscosity, likewise different options are provided by the state of the art, such as disclosed, for example, in DE10050299A1, DE102007043811A1, DE10057974A1, DE102006033819A1, DE102015102834A1 or DE102016112743A1.

Used for the driving/receiving unit are, especially, piezoelectric and/or electromagnetic driving/receiving units. In the case of driving/receiving units based on the piezoelectric effect, as a rule, a relatively high efficiency can be achieved. They are, however, only conditionally suitable for use at high temperatures, especially temperatures above 300° C. An alternative in this connection is given by electromagnetic driving/receiving units, such as described, for example, in WO2007/113011, WO2007/114950 A1, DE102015104533A1, DE102016112308A1. The changing of electrical energy into mechanical energy occurs here, in each case, via a magnetic field. The described transducer units comprise therefor each at least a coil and a permanent magnet. By means of the coil, a magnetic, alternating field passing through the magnet is produced and via the magnet a periodic force is transmitted to the oscillatable unit. Such a driving/receiving unit is usable, depending on utilized materials, for example, for a temperature range between −200° C. and 500° C.

In order to assure the reliable working of a vibronic sensor, the state of the art provides a wide variety of methods for diagnosis of possible malfunctions of a vibronic sensor. The opportunity for a state monitoring or diagnosis is especially important in the case of safety-critical applications, such as, for example, use of a limit level switch in a container filled with a combustible liquid. Depending on the particular application, a measurement device must satisfy different safety requirements. To this end, for example, the so-called SIL standard (SIL stands for safety integrity level) conforming to the standard IEC61508 is provided, which distinguishes between four different levels for specifying the requirement for the safety integrity of safety functions. The required safety level represents, in such case, in principle, a measure for the reliability of the particular system, or measurement device, as a function of a potential danger. Typically provided safety functions for assuring a certain level for the safety integrity are provided, for example, by emergency turn off switches, or the turning off of overheated devices.

For establishing a safety integrity level, for example, the failure behavior of individual modules is examined. Furthermore, the presence of redundant structures is checked, as well as the ratio between safe and unsafe, or dangerous, failures. From such considerations, then a total failure rate can be determined, based on which a particular safety integrity level is associated with the particular system, or measurement device.

DE102004027397A1 describes a possibility for detecting a cable break in a vibronic sensor. Known from DE10014724A1 and DE102009045204A1 are diagnostic possibilities for detecting accretion in the region of the oscillatable unit. However, also diagnostics in the region of the driving/receiving unit of a vibronic sensor are known, such as, for example, the diagnosis of a piezoelectric driving/receiving unit described in DE102008032887A1. In the case of an electromagnetic driving/receiving unit, it is, in turn, known from DE102017115147A1 to judge the state of the driving/receiving unit based on the total ohmic resistance.

SUMMARY

Starting from the state of the art, an object of the invention is to provide a measurement device, with which high safety requirements can be satisfied in especially easy manner.

The object is achieved by the method as defined in claim 1 as well as by the device as defined in claim 14.

In the case of the method, the object is achieved by a method for state monitoring of a coil, which coil is part of a device for determining at least one process variable of a medium in a containment. The coil is supplied with an electrical excitation signal and an electrical, received signal is received from the coil. Furthermore, a first frequency for the excitation signal is ascertained, in the case of which a first phase shift between the excitation signal and received signal is less than a predeterminable limit value, and based on the first frequency a state indicator for the coil is ascertained.

Diagnosis of the driving/receiving unit is implementable in especially easy manner via a first phase shift between exciter- and received signal. Especially, the structural effort is very small—the implementing of the state monitoring requires only very few additional components for a given sensor.

Advantageously, the first phase shift at the first frequency is zero. Thus, a zero crossing of the phase shift is detected as a function of the first frequency.

It is likewise advantageous that the first frequency be the resonant frequency of the coil in the fundamental oscillation mode.

An especially preferred embodiment of the method of the invention includes that an actual value for the first frequency is compared with a desired value for the first frequency, wherein the state indicator is ascertained based on a deviation of the actual value from the desired value.

In such case, advantageously based on the deviation between the actual value and the desired value, information is ascertained regarding extent of damage in the coil. Thus, not only a qualitative, but, instead, also a quantitative statement regarding state of the coil is possible.

It is likewise advantageous that when the deviation of the actual value from the desired value is less than a predeterminable value, a report regarding a maintenance to be performed is generated, and/or wherein when the deviation of the actual value from the desired value is greater than the predeterminable value, a report regarding a defect of the coil is output. If the deviation is less than the predeterminable limit value, the sensor can still be operated. In this case, only an indication of maintenance to be performed in a short timeframe is provided. Possible measurement inaccuracies, which originate from the defect, can, in given cases, be removed by calculation. If the deviation exceeds the limit value, however, then the sensor must be replaced or be subjected to maintenance immediately. A reliable operation of the sensor can no longer be guaranteed.

Another embodiment includes that the state indicator is information regarding presence of at least one winding short in the region of the coil or information regarding a poor electrical contacting or a cable break in the region of the coil or in the region of the at least two connection wires.

Another especially preferred embodiment of the invention includes that, based on a second phase shift between the excitation signal and the received signal at a second frequency, information regarding a temperature of the medium is ascertained. Thus, besides the state monitoring, the method of the invention enables a determining of temperature without having to install an additional, temperature sensitive, sensor element.

The temperature in the region of a vibronic sensor and in the region of the medium has a large influence on determining the particular process variable, especially a large influence on the received signal. In order to compensate this influence, it is known from DE102006007199A1 or DE102009029490A1 to provide a vibronic measurement device with an additional temperature sensor. The integration of an additional sensor into a measurement device, is, however, basically associated with a certain added effort. Known from DE102017114315A1 in the case of an electromagnetic driving/receiving unit is to determine the temperature of the medium based on an electrical characteristic variable, for example, based on the ohmic resistance, of the coil. However, also such a measure is associated with a relatively high effort, since means for determining the particular characteristic variable have to be provided. The temperature determination of the invention based on a second frequency for the excitation signal is, in contrast, implementable in especially easy manner. The phase shift at the second frequency has a direct dependence on the temperature of the medium and can be directly taken into consideration for temperature determination. Thus, no additional sensor elements or complex structural measures are necessary for the temperature determination.

It is with reference to the temperature of the medium also an option that the influence of the temperature on a sensor signal is compensated, for example, for the first received signal corresponding to the first frequency or another frequency. In this way, the accuracy of measurement of the particular sensor for ascertaining the particular process variable can be increased.

It is relative to the second frequency advantageous that the second frequency be selected in such a manner that it lies in the region of a resonance width of a resonant oscillation of the coil at a maximum temperature of the medium, which is determinable. The resonance width dependent on the quality of the particular sensor is greater with increasing temperature. When the frequency is so selected that it lies for the maximum temperature to be determined, for example, a maximum temperature allowable for operation of the sensor, within the resonance width, then it can for all temperatures be assured that the second frequency is selected suitably for temperature determination. For the second frequency, the phase shift then has a direct dependence on the temperature of the medium and this can be used for temperature determination.

It is, thus, likewise advantageous that the temperature of the medium is ascertained based on a comparison of the second phase shift at the second frequency using at least one characteristic line of temperature as a function of the second frequency.

Furthermore, advantageously based on a third phase shift between the excitation signal and the received signal at a third frequency, information regarding a temperature of the medium can be ascertained. In such case, the temperature can be ascertained redundantly at two different frequencies.

To this end, it is, in turn, advantageous that the temperatures ascertained by means of the second and third frequencies are compared with one another. In this way, a plausibility check can be performed as regards the temperature determination.

Likewise it is advantageous relative to the use of a third frequency that the second frequency is greater than the first frequency and the third frequency is less than the first frequency.

The first, second and/or third frequency can especially be set, alternately, or, in each case, as required, for example, as a result of suitable selection. Besides the state monitoring, also a process variable of the medium, for example, a fill level, especially a predeterminable fill level, the density or the viscosity, can be determined and/or monitored. Set for the excitation signal for such purpose can be one of the frequencies used for state monitoring or another, fourth frequency. The state monitoring and ascertaining of the particular process variable can likewise be performed alternately or, at least partially, simultaneously.

The object of the invention is achieved, furthermore, by a device for determining and/or monitoring at least one process variable of a medium in a container, comprising at least one coil and embodied to perform a method according to at least one of the described embodiments.

Regarding the device, it is advantageous when it is a vibronic sensor comprising a mechanically oscillatable unit, a driving/receiving unit having at least one coil, which driving/receiving unit is embodied to excite the mechanically oscillatable unit by means of an electrical excitation signal, such that mechanical oscillations are executed, and to receive the mechanical oscillations from the oscillatable unit and to transduce them into an electrical, received signal, and an electronics unit, which is embodied to produce the excitation signal starting from the received signal, and to ascertain the at least one process variable from the received signal.

In an embodiment of the device, the oscillatable unit is a membrane, a single tine or an oscillatory fork.

Another embodiment of the device includes that the process variable is a fill level, especially a predeterminable fill level, the density or the viscosity of the medium.

In the context of the invention, the most varied of embodiments of a vibronic sensor can be used, especially different driving/receiving units. In the following, without intending to limit the general applicability of the invention, two especially preferred embodiments of a driving/receiving unit will be explained.

In one embodiment, the driving/receiving unit includes at least
  a displaceable membrane to execute mechanical oscillations,
  two rods perpendicular to a face of the membrane and secured to the membrane,
  a housing, wherein the membrane forms at least a part of a wall of the housing, and wherein the two rods extend in the housing interior,
  two magnets, each secured to a membrane-far, end region of its one of the two rods, and
  a coil with core, wherein the coil with core is secured within the housing above the magnets, and wherein the coil is suppliable with an electrical, alternating current signal,
    wherein the coil is embodied to produce a magnetic field, which by means of the two magnets causes the two rods to execute mechanical oscillations, and
    wherein the two rods are secured to the membrane in such a manner that oscillations of the membrane result from the oscillations of the two rods.

In an additional embodiment, the driving/receiving unit includes at least
  a displaceable membrane for executing mechanical oscillations,
  at least three rods perpendicular to a face of the membrane and secured to the membrane,
  a housing, wherein the membrane forms at least a part of a wall of the housing, and wherein the rods extend in the housing interior,
  at least three magnets each secured to the membrane-far, end region of its one of the at least three rods, and
  wherein the coil with core is secured within the housing above the magnets, and wherein the coil is suppliable with an electrical, alternating current signal,
    wherein the coil is embodied to produce a magnetic field, which by means of the magnets causes the rods to execute mechanical oscillations,
    wherein the rods are secured to the membrane in such a manner that oscillations of the membrane result from the oscillations of the rods,
    wherein at least one of the rods is secured on the membrane essentially at a site along the face the membrane,
    where the second derivative of the deflection of the membrane from a rest position as a function of site on the face is essentially zero.

Especially preferred, moreover, is a driving/receiving unit according to one of the two embodiments described above by way of example and having four rods. With reference to the two preferred, described embodiments for the driving/receiving unit, comprehensive reference is taken to DE102015104533A1 and DE102016112308A1.

Furthermore, it is be noted that the embodiments described in connection with the method of the invention can be applied mutatis mutandis also for the device of the invention and vice versa.

BRIEF DESCRIPTION OF THE DRAWINGS

The invention as well as its advantageous embodiments will now be described in greater detail based on the appended drawing, the figures of which show as follows.

DETAILED DESCRIPTION

Figure 1A:
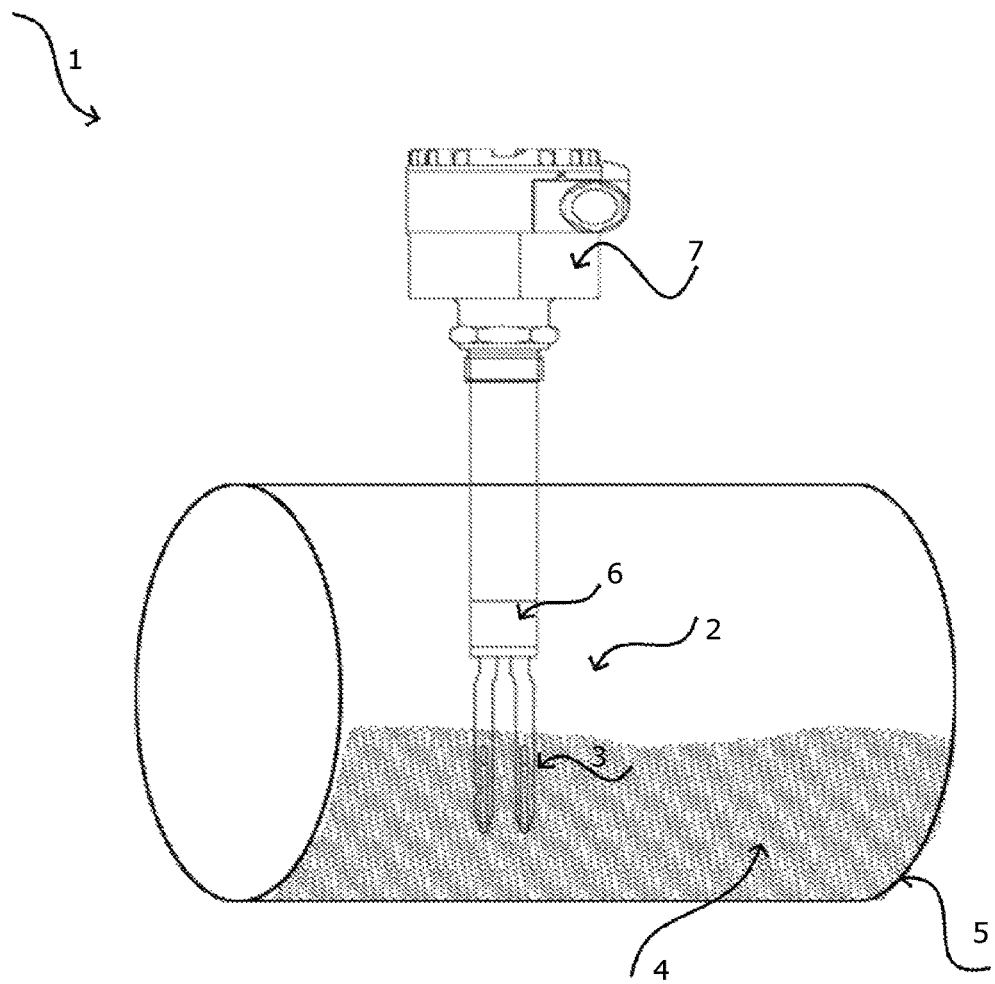
FIGS. 1a, 1b show an illustration of a vibronic sensor according to the state of the art.

FIG. 1a shows a vibronic fill level measurement device 1. A sensor unit 2 having a mechanically oscillatable unit 3 in the form of an oscillatory fork protrudes partially into a medium 4, which is located in a container 5. The oscillatable unit 3 is excited by means of the driving/receiving unit 6, as a rule, an electromechanical transducer unit, such that mechanical oscillations are executed. The driving/receiving unit 6 can be, for example, a piezoelectric stack- or bimorph drive, however, also an electromagnetic and even magnetostrictive, driving/receiving unit. It is understood, however, that also other embodiments of a vibronic fill level measurement device are possible. Further shown is an electronics unit 7, by means of which signal registration, —evaluation and/or—feeding occurs.

Figure 1B:
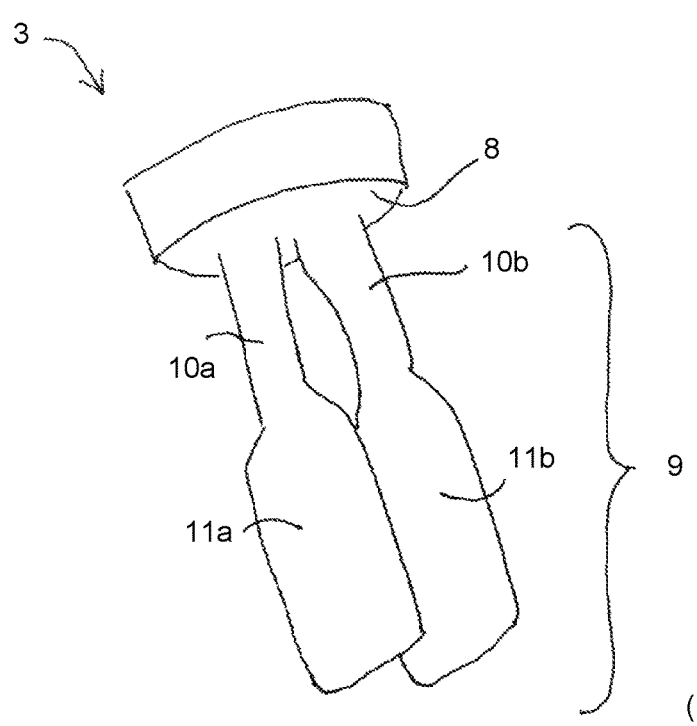

FIG. 1b shows a more detailed view of an oscillatable unit 3 in the form of an oscillatory fork, such as is applied, for example, for the vibronic sensor sold by the applicant under the mark LIQUIPHANT. Shown is a membrane 8 and, connected therewith, an oscillatory element 9. The oscillatory element 9 includes two oscillatory tines 10a, 10b, on which is formed terminally, in each case, a paddle 11a, 11b. In operation, the oscillatory fork 3 executes oscillatory movements corresponding to the oscillatory mode, with which it is excited. Each of the two oscillatory tines 10a, 10b behaves essentially as a so-called bending oscillator. In the fundamental oscillation mode, the two oscillatory tines 10a, 10b oscillate, for example, with opposite phase relative to one another.

Although in the context of the invention numerous embodiments can be applied for the driving/receiving unit 6, the following description concerns (without intending to limit the general applicability of the invention) electromagnetic driving/receiving units 6 having at least one coil, such as described in DE102015104533A1 or DE102016112308A1. Comprehensive reference is taken to these two documents in the context of invention.

Figure 2A:
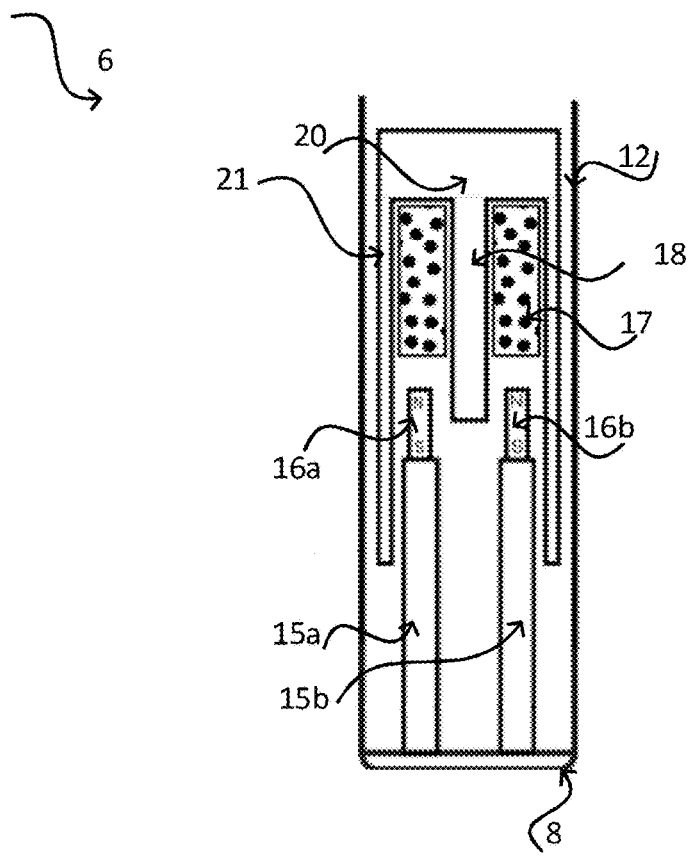
FIGS. 2a, 2b show two possible embodiments of a vibronic sensor with preferred electromagnetic driving/receiving units.

FIG. 2a shows a schematic view of such a driving/receiving unit 6. A housing 12 is closed at the lower end with a membrane 8, which is to interact with the oscillatable unit 3. In the case of the embodiment shown here, the housing 12 is cylindrical and the disk shaped membrane 8 has a circularly round cross sectional area A. It is understood, however, that also other geometries can be used and fall within the scope of the invention. Extending perpendicularly from securement on the inner face of the membrane 8 and inwardly into the interior of the housing 12 are two rods 15a, 15b. In such case, the securement is especially capable of transmitting a force. Membrane 8 thus lies in a plane perpendicular to the longitudinal direction of the rods 15a, 15b.

Secured In the membrane 8 far, end region of the rods 15a, 15b, in each case, is a magnet 16a, 16b, especially an SmCo- or Alnico magnet. The magnets 16a, 16b are preferably all equally oriented. Arranged above the magnets 16a, 16b is a coil 17, which comprises wire wound around the core 18. The core 18 of the coil 17 is part of a pot shaped armature unit 19 having a floor 20 as well as a peripheral wall 21. The floor 20 can have, for example, a circular cross sectional area, same as the inner face of the membrane 8. From the floor 20 of the pot shaped armature unit 19, the core 18 of the coil 17 extends in the form of a rod centrally into the interior of the armature unit 19. The peripheral wall 21 has, in this case, then the function of guiding a magnetic field back. The rods 15a, 15b with the magnets 16a and 16b do not contact the coil 17 and the core 18. The coil 17 in ongoing operation is supplied with an alternating current signal for producing a magnetic, alternating field. For this, the coil has two connection wires (not shown in FIG. 2a).

Due to the alternating field, the rods 15a and 15b are deflected via the magnets 16a and 16b horizontally, i.e. perpendicularly or transversely to their longitudinal axes, in such a manner that they are caused to execute oscillations. On the one hand, the rods 15a and 15b have then a lever effect, as a result of which the bending of the rods 15a and 15b produced by the horizontal deflection is transmitted to the membrane 8 in such a manner that the membrane 8 is caused to execute oscillations. On the other hand, the combination of the two rods 15a and 15b and the membrane 8 forms a separate resonator.

Figure 2B:
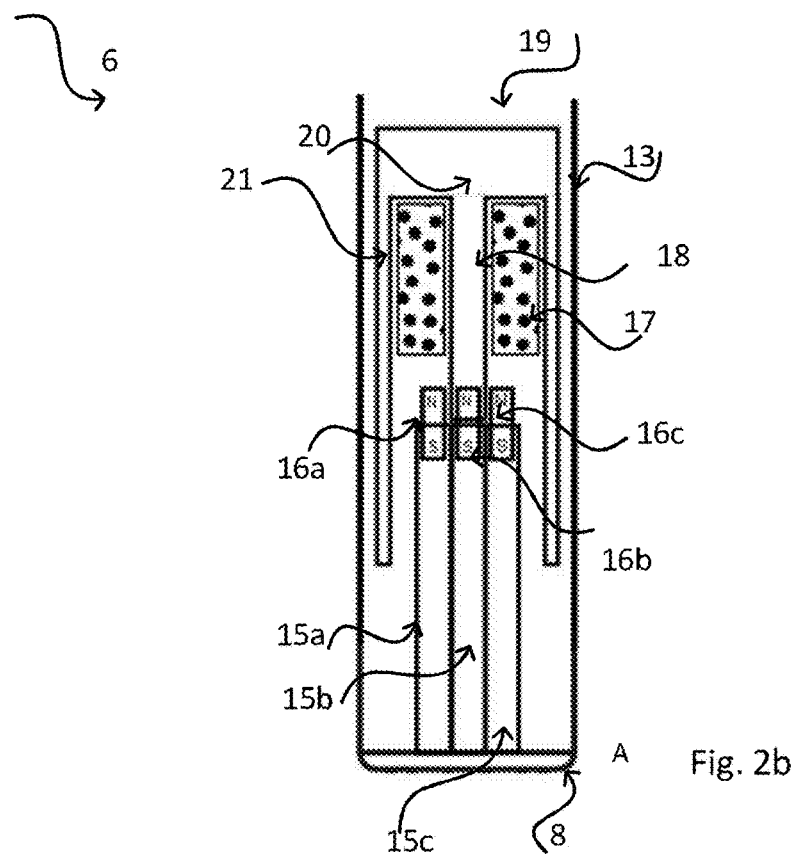

FIG. 2b shows an electromechanical transducer unit 6 similar to that shown in FIG. 2a with the difference that in FIG. 2b three rods 15a-15c as well as three magnets 16a-16c are present, such as disclosed in DE102016112308A1. The electromechanical transducer unit can, however, also have four or more rods.

In the case of the embodiments of FIG. 2, the two oscillatory tines 10a, 10b of the mechanically oscillatable unit 3 as well as the rods 15a-15c of the transducer unit 6 form with the membrane 8, in each case, a mechanical resonator. In such case, the membrane 8 is preferably, but not necessarily, embodied as one piece. Especially, it forms an intermediary between the oscillatable unit 3 and the transducer unit 6.

According to the invention, a state monitoring of a vibronic sensor is performed, in the case of which based on a first frequency for the excitation signal, at which a first phase shift between the excitation signal and received signal is less than a predeterminable limit value, a state indicator for the coil is ascertained.

Figure 3A:
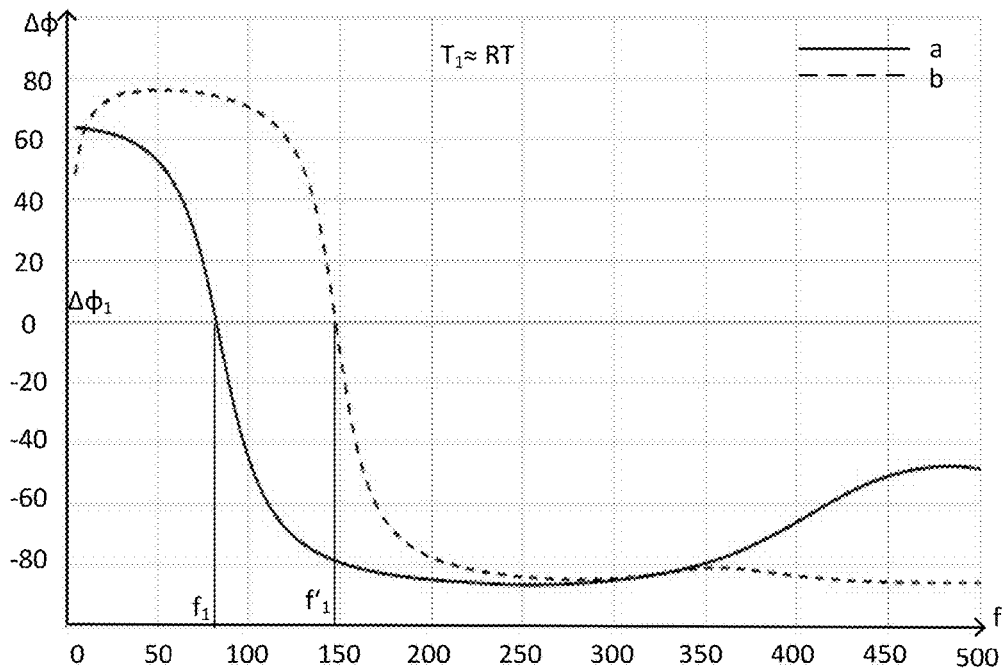
FIGS. 3a, 3b, 3c show graphs of phase shift between excitation signal and received signal as a function of frequency of the excitation signal, respectively for a function capable coil and for a partially defective coil at three different temperatures.
Figure 3B:
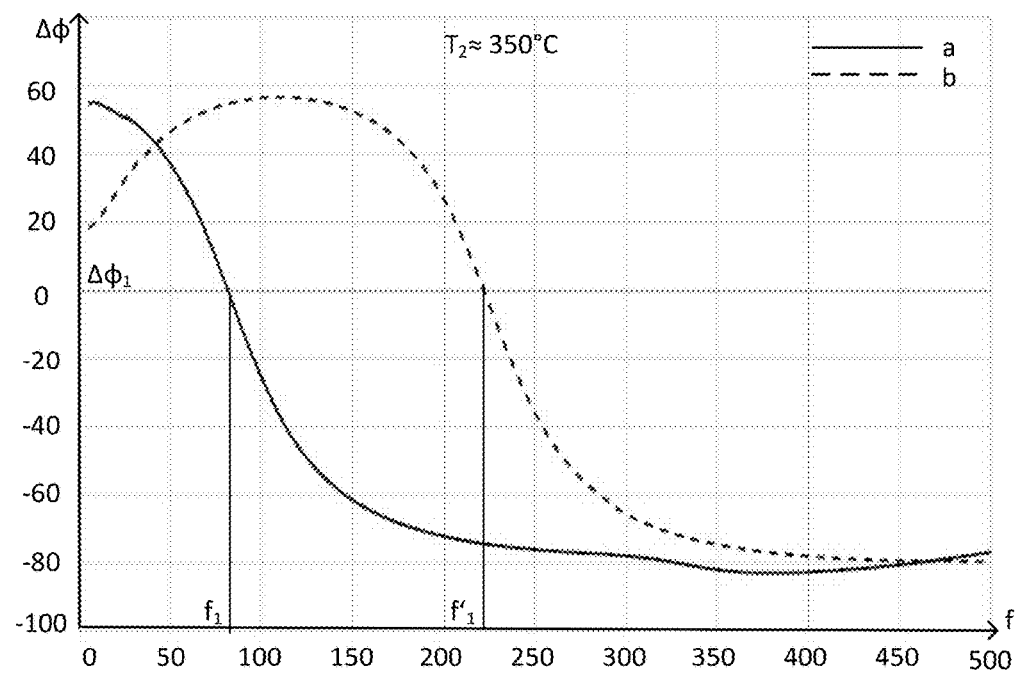
Figure 3C:
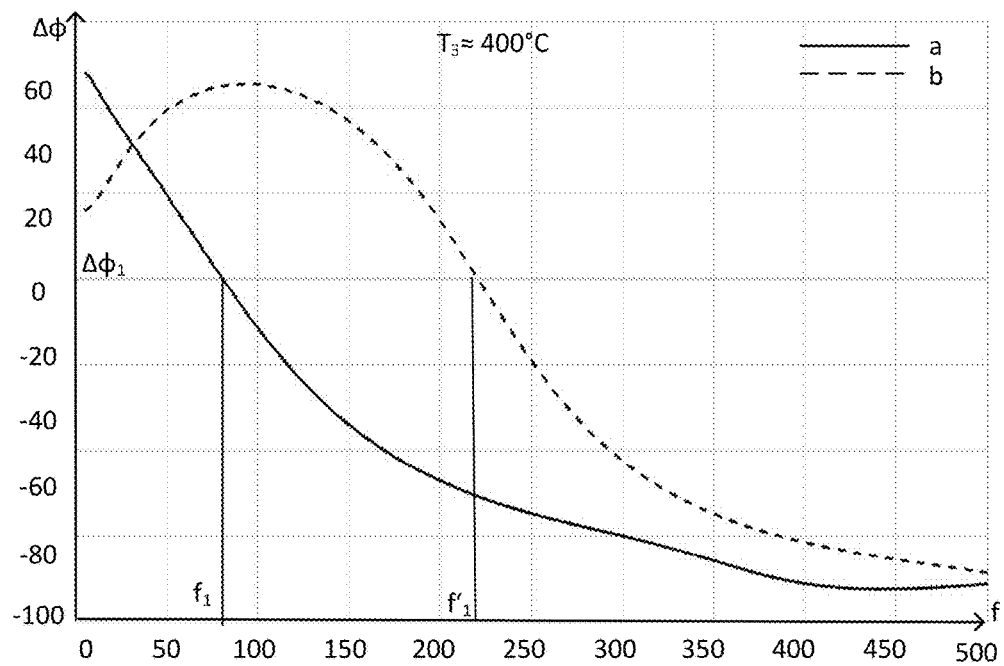

An embodiment of the state monitoring of the coil 17 according to the invention is shown in FIG. 3. The state monitoring rests on the fact that the first phase shift $\Delta\phi_1$ between the excitation signal E and the received signal R as a function of frequency f of the excitation signal E is directly influenced by the state of the coil 17. Shown in FIGS. 3a-3c is the first phase shift $\Delta\phi_1$ (f) for three different temperatures, in each case, for a fully function capable coil 17(a) and a partially short circuited coil 17(b). The process temperature T amounts for FIG. 3a to $T_1 \approx RT$, for FIG. 3b to $T_2 \approx 350°$ C. and for FIG. 3c to $T_3 \approx 400°$ C.

A defect of the coil 17 leads to a shifting of the phase shift $\Delta\phi$ at a predeterminable first frequency $f_1$ for the excitation signal E. In the case of the embodiment shown here, the first frequency $f_1$ is selected in such a manner that $\Delta\phi_1 = 0$, thus, at a zero crossing for the first phase shift $\Delta\phi_1$. At this frequency $f_1$, the zero crossing of the first phase shift $\Delta\phi_1$ is not influenced by the process temperature T. In the case of a defect of the coil 17, the frequency $f_1$ changes to the value $f_1'$. The zero crossing for the first phase shift $\Delta\phi_1$ is located, thus, now at the value $f_1'$, which differs from the desired value $f_1$. Based on the deviation of the actual value $f_1'$ for the first frequency from the desired value $f_1$, thus, a defect of the coil 17 can be detected. The size of the deviation between the actual and desired value provides, furthermore, information regarding the degree of the defect of the coil 17.

Figure 4:
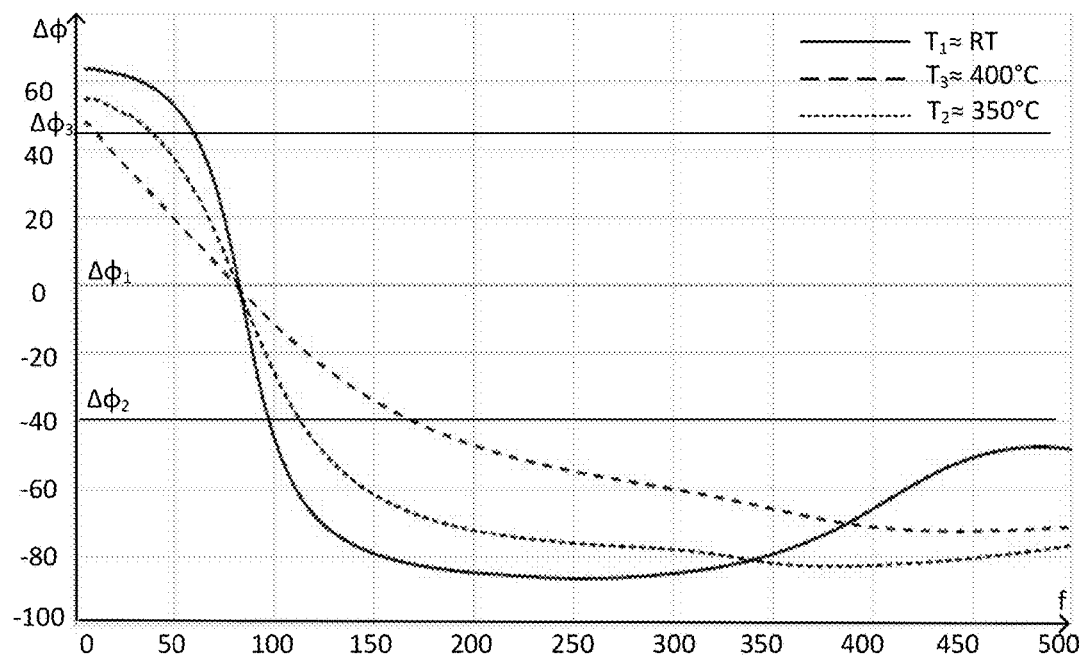
FIG. 4 shows a graph of phase shift between excitation signal and received signal as a function of frequency of the excitation signal for different temperatures.

The opportunity for a supplemental temperature determination T based on a second phase shift $\Delta\phi_2$ as a function of frequency f of the excitation signal is, finally, shown in FIG. 4. The temperature T is determined at a second frequency $f_2$ corresponding to a second phase shift $\Delta\phi_2$. The second frequency $f_2$ is selected in such a manner that it lies in the region of a resonance width of a resonant oscillation of the coil 17 at a maximum temperature T of the medium 4, which is determinable. From the graph shown in FIG. 4, it is evident that the second frequency $f_2$, at which the second phase shift $\Delta\phi_2$ is present, depends on the temperature T of the medium. Thus, the temperature T can be determined, for example, based on a characteristic line, which gives the temperature T as a function of second frequency $f_2$.

Moreover, it is possible to determine a third phase shift $\Delta\phi_3$, which corresponds to a third frequency $f_3$ for the excitation signal E. Also in the case of third phase shift $\Delta\phi_3$, information regarding temperature T of the medium 4 can be gathered, especially based on a characteristic line. The two temperatures ascertained at the two phase shifts $\Delta\phi_2$ and $\Delta\phi_3$ can, moreover, be compared with one another especially for the purpose of a plausibility check.

In summary, the invention enables, in especially easy manner, a state monitoring of a vibronic sensor 1 and, in given cases, supplementally a determining of temperature T of the medium 4, especially without integration of further components into the vibronic sensor 1. The state monitoring can occur in parallel with, or alternately to, the normal measurement operation of the sensor 1. Especially, besides a qualitative statement regarding state of the sensor, even a quantitative statement concerning the extent of a defect is possible.

The invention claimed is:

1. A method for state monitoring of a coil that is a part of a device for determining at least one process variable of a medium in a containment, the method comprising:
   supplying the coil with an alternating electrical excitation signal and varying a frequency of the excitation signal from a starting frequency to an ending frequency;
   receiving an electrical received signal from the coil during the varying of the frequency of the excitation signal;
   measuring a phase shift between the excitation signal and the received signal;
   ascertaining a first frequency for the excitation signal such that a first phase shift between the excitation signal and the received signal at the first frequency is less than a predeterminable limit value;
   comparing an actual value for the first frequency with a desired value for the first frequency;
   ascertaining a state indicator for the coil based on a deviation of the actual value of the first frequency from the desired value of the first frequency; and
   ascertaining information regarding an extent of damage in the coil based on the deviation between the actual value of the first frequency and the desired value of the first frequency.

2. The method as claimed in claim 1,
   wherein the phase shift at the first frequency is zero.

3. The method as claimed in claim 1,
   wherein the first frequency is a resonant frequency of the coil in a fundamental oscillation mode.

4. A device for determining and/or monitoring at least one process variable of a medium in a container, comprising:
   at least one coil,
   wherein the device is embodied to perform a method, including:
      supplying the coil with an alternating electrical excitation signal and varying a frequency of the excitation signal from a starting frequency to an ending frequency;
      receiving an electrical received signal from the coil during the varying of the frequency of the excitation signal;
      measuring a phase shift between the excitation signal and the received signal;
      ascertaining a first frequency for the excitation signal such that a first phase shift between the excitation signal and the received signal at the first frequency is less than a predeterminable limit value;
      comparing an actual value for the first frequency with a desired value for the first frequency;
      ascertaining a state indicator for the coil based on a deviation of the actual value of the first frequency from the desired value of the first frequency; and
      ascertaining information regarding an extent of damage in the at least one coil based on the deviation between the actual value of the first frequency and the desired value of the first frequency.

5. The device as claimed in claim 4,
   wherein the device is a vibronic sensor, the device further comprising:
      a mechanically oscillatable unit,
      a driving/receiving unit having at least one coil, wherein the driving/receiving unit is embodied to excite the mechanically oscillatable unit by an electrical excitation signal such that mechanical oscillations are executed and to receive the mechanical oscillations from the oscillatable unit and further embodied to transduce the received mechanical oscillations into an electrical, received signal; and
      an electronics unit embodied to produce the excitation signal starting from the received signal and to ascertain the at least one process variable from the received signal.

6. A method for state monitoring of a coil that is a part of a device for determining at least one process variable of a medium in a containment, the method comprising:
   supplying the coil with an alternating electrical excitation signal and varying a frequency of the excitation signal from a starting frequency to an ending frequency;
   receiving an electrical received signal from the coil during the varying of the frequency of the excitation signal;
   measuring a phase shift between the excitation signal and the received signal;
   ascertaining a first frequency for the excitation signal such that a phase shift between the excitation signal and the received signal at the first frequency is less than a predeterminable limit value;
   comparing an actual value for the first frequency with a desired value for the first frequency;
   ascertaining a state indicator for the coil based on a deviation of the actual value of the first frequency from the desired value of the first frequency;
   generating a report regarding a maintenance to be performed when the deviation of the actual value of the first frequency from the desired value of the first frequency is less than a predeterminable value; and
   outputting a report regarding a defect of the coil when the deviation of the actual value from the desired value is greater than the predeterminable value.

7. A method for state monitoring of a coil that is a part of a device for determining at least one process variable of a medium in a containment, the method comprising:
   supplying the coil with an alternating electrical excitation signal and varying a frequency of the excitation signal from a starting frequency to an ending frequency;
   receiving an electrical received signal from the coil during the varying of the frequency of the excitation signal;
   measuring a phase shift between the excitation signal and the received signal;
   ascertaining a first frequency for the excitation signal such that a phase shift between the excitation signal and the received signal at the first frequency is less than a predeterminable limit value;

ascertaining a temperature of the medium based on a phase shift between the excitation signal and the received signal at a second frequency, wherein the second frequency is selected such that it lies in a region of a resonance width of a resonant oscillation of the coil at a maximum temperature of the medium; and ascertaining a state indicator for the coil based on the first frequency.

8. The method as claimed in claim 7, wherein the temperature of the medium is ascertained based on a comparison of the phase shift at the second frequency with at least one characteristic line of temperature as a function of the second frequency.

9. The method as claimed in claim 8, further comprising:

ascertaining a temperature of the medium based on a phase shift between the excitation signal and the received signal at a third frequency.

10. The method as claimed in claim 9, further comprising:

comparing the temperatures ascertained by means of the second and third frequency with one another.

11. The method as claimed in claim 10, wherein the second frequency is greater than the first frequency and the third frequency is less than the first frequency.

* * * * *